(12) United States Patent
Reynolds et al.

(10) Patent No.: US 7,650,238 B2
(45) Date of Patent: Jan. 19, 2010

(54) ENVIRONMENTAL CHARACTERISTIC DETERMINATION

(75) Inventors: Christopher I. Reynolds, Walpole, MA (US); Donald Heckathorn, Norfolk, MA (US); Michael Perlmutter, Sherborn, MA (US); Ian Humphrey, Foxboro, MA (US)

(73) Assignee: Northrop Grumman Corporation, Los Angeles, CA (US)

( * ) Notice: Subject to any disclaimer, the term of this patent is extended or adjusted under 35 U.S.C. 154(b) by 552 days.

(21) Appl. No.: 11/125,041

(22) Filed: May 9, 2005

(65) Prior Publication Data

US 2006/0253253 A1 Nov. 9, 2006

(51) Int. Cl.
*G01C 21/00* (2006.01)
(52) U.S. Cl. ............... 701/220; 701/37; 73/1.73; 73/3; 73/290; 340/601; 340/618
(58) Field of Classification Search ........... 701/220, 701/36, 20, 7; 340/601, 939, 933, 540, 500, 340/618; 73/3, 1.73, 290 R
See application file for complete search history.

(56) References Cited

U.S. PATENT DOCUMENTS

| 4,303,978 | A | * | 12/1981 | Shaw et al. ............... 701/220 |
| 4,566,327 | A | | 1/1986 | Rider |
| 4,601,206 | A | | 7/1986 | Watson |
| 4,799,047 | A | * | 1/1989 | Saitoh .................... 340/618 |
| 4,912,646 | A | * | 3/1990 | Cerruti ..................... 702/55 |
| 5,134,393 | A | | 7/1992 | Henson |
| 5,396,326 | A | | 3/1995 | Knobbe et al. |
| 5,542,394 | A | * | 8/1996 | Tomisawa ................ 123/491 |
| 5,642,280 | A | | 6/1997 | Negrin et al. |
| 5,755,206 | A | * | 5/1998 | Takahashi et al. ...... 123/406.37 |
| 5,826,459 | A | * | 10/1998 | Kataoka et al. ............. 73/290 R |
| 5,905,193 | A | * | 5/1999 | Hashizume et al. ........ 73/35.09 |
| 6,038,025 | A | | 3/2000 | Weed |
| 6,188,645 | B1 | | 2/2001 | Maida et al. |
| 6,209,383 | B1 | | 4/2001 | Mueller et al. |
| 6,257,057 | B1 | | 7/2001 | Hulsing et al. |
| 6,470,240 | B1 | | 10/2002 | Haynes et al. |
| 6,510,732 | B1 | * | 1/2003 | Liang et al. ............. 73/116.02 |
| 6,546,328 | B1 | * | 4/2003 | Slicker .................... 701/111 |
| 6,644,115 | B2 | * | 11/2003 | Cwik et al. ............. 73/290 R |

(Continued)

FOREIGN PATENT DOCUMENTS

EP 0 848 231 6/1998

(Continued)

OTHER PUBLICATIONS

Chip-Scale Integration of Data-Gathering Microsystems, Lemmerhirt, D.F.; Wise, K.D.; Proceedings of the IEEE vol. 94, Issue 6, Jun. 2006 pp. 1138-1159, Digital Object Identifier 10.1109/JPROC. 2006.873619.*

(Continued)

*Primary Examiner*—Cuong H Nguyen
(74) *Attorney, Agent, or Firm*—Carmen Patti Law Group, LLC

(57) ABSTRACT

A processor of an apparatus in one example makes a determination of an environmental characteristic based on an average of a plurality of concomitant values that correspond to the environmental characteristic.

20 Claims, 5 Drawing Sheets

402

502

U.S. PATENT DOCUMENTS

| | | | |
|---|---|---|---|
| 6,718,280 B2 | | 4/2004 | Hermann |
| 6,796,177 B2 | * | 9/2004 | Mori ........................ 73/504.02 |
| 6,862,517 B2 | * | 3/2005 | Galtier ........................ 701/111 |
| 6,867,691 B2 | * | 3/2005 | Nishimura .................. 340/439 |
| 7,021,117 B2 | * | 4/2006 | Cho ............................ 73/1.73 |
| 7,040,922 B2 | | 5/2006 | Harney et al. |
| 7,112,780 B2 | | 9/2006 | Mechler |
| 7,117,605 B2 | | 10/2006 | Ekseth et al. |
| 7,248,967 B2 | | 7/2007 | Hagstedt |
| 7,532,992 B2 | * | 5/2009 | Liescheski .................. 702/100 |
| 2003/0005767 A1 | | 1/2003 | Hulsing et al. |
| 2004/0186676 A1 | | 9/2004 | Liu et al. |
| 2006/0250257 A1 | * | 11/2006 | Reynolds .................... 340/601 |
| 2006/0253253 A1 | * | 11/2006 | Reynolds et al. ............ 701/220 |

FOREIGN PATENT DOCUMENTS

| | | | |
|---|---|---|---|
| EP | 1 231 473 | | 8/2002 |
| JP | 11111319 A | * | 4/1999 |
| JP | 2000039356 A | * | 2/2000 |
| JP | 02005273976 A | * | 10/2005 |
| WO | WO 8603584 A | * | 6/1986 |

OTHER PUBLICATIONS

A Bayesian approach to diagnosis and prognosis using built-in test, Sheppard, J.W.; Kaufman, M.A.; Instrumentation and Measurement, IEEE Transactions on, vol. 54, Issue 3, Jun. 2005 pp. 1003-1018, Digital Object Identifier 10.1109/TIM.2005.847351.*

Networks of Sensors in Public Spaces: Combining Technology with ArtPai, Sameer; Kuryloski, Philip; Yip, Henry; Yennamandra, Srikant; Wicker, Stephen; Boehner, Kirsten; Gay, Geri; Advanced Information Networking and Applications Workshops, 2007, AINAW '07. 21st International Conference on,vol. 2, May 21-23, 2007 pp. 396-402 ,Digital Object.*

A High G, MEMS Based, Deeply Integrated, INS/GPS, Guidance, Navigation and Control Flight Management Unit , Buck, T.M.; Wilmot, J.; Cook, M.J.; Position, Location, And Navigation Symposium, 2006 IEEE/ION Apr. 25-27,2006 pp. 772-794.*

Deploying a Sensor Network in an Extreme Environment, Martinez, K.; Padhy, P.; Elsaify, A.; Zou, G.; Riddoch, A.; Hart, J.K.; Ong, H.L.R.; Sensor Networks, Ubiquitous, and Trustworthy Computing, 2006. IEEE International Conference on vol. 1, Jun. 5-7, 2006 pp. 186-193.*

Model based error correction for wireless sensor networks, Mukhopadhyay, S.; Panigrahi, D.; Dey, S.; Sensor and Ad Hoc Communications and Networks, 2004. IEEE SECON 2004. 2004 First Annual IEEE Communications Society Conference on, Oct. 4-7, 2004 pp. 575-584 , Digital Object Identifier 10.1109/SAHCN.2004.1381960.*

IEEE Recommended Practice for Inertial Sensor Test Equipment, Instrumentation, Data Acquisition, and Analysis 2005 pp. 0_1-103.*

IEEE guide for measurement of environmental sensitivities of standard frequency generators Feb. 27, 1995.*

Dual Kalman filters for autonomous terrain aided navigation in unknown environments; Paul, A.S.; Wan, E.A.; Neural Networks, 2005. IJCNN'05. Proceedings. 2005 IEEE International Joint Conference on, vol. 5, Jul. 31-Aug. 4, 2005, pp. 2784-2789 vol. 5, Digital Object Identifier 10.1109/IJCNN.2005.1556366.*

The role of acoustic ground sensors in multi-sensor surveillance systems; Hall, D.L.; Aerospace Conference, 2003 Proceedings. 2003 IEEE; vol. 5, Mar. 8-15, 2003 pp. 5_2167-5_2174.*

A Fuzzy Reasoning Model of Two-Dimensional Warranty System;Sang Hyun Lee; Jae Hee Lee; Seung beom Park; Min Tae Lee; SangJoon Lee; Kyung Il Moon; Byung Ki Kim; Advanced Language Processing and Web Information Technology, 2008. ALPIT '08. International Conference on; Jul. 23-25, 2008 pp. 287-292; Digital Object Identifier 10.1109/ALPIT.2008.57.*

Minimizing False Alarms on Intrusion Detection for Wireless Sensor Networks in Realistic Environments; Parekh, Bhavik; Cam, Hasan; Military Communications Conference, 2007. MILCOM 2007. IEEE; Oct. 29-31, 2007 pp. 1-7; Digital Object Identifier 10.1109/MILCOM.2007.4455315.*

Landmark Selection for Vision-Based Navigation; Sala, P.; Sim, R.; Shokoufandeh, A.; Dickinson, S.; Robotics, IEEE Transactions on; vol. 22, Issue 2, Apr. 2006 pp. 334-349; Digital Object Identifier 10.1109/TRO.2005.861480.*

Increasing Handset Performance Using True Polarization Diversity; Valenzuela-Valdes, Juan F.; Sanchez-Hernandez, David A.; Vehicular Technology Conference, 2009. VTC Spring 2009. IEEE 69$^{th}$; Apr. 26-29, 2009 pp. 1-4; Digital Object Identifier 10.1109/VETECS.2009.5073600.*

Human Operator's Weight Perception of an Object Vertically Lifted with a Power Assist System; Rahman, S.M.M.; Ikeura, R.; Nobe, M.; Sawai, H.; System Integration, 2008 IEEE/SICE International Symposium on, 4-4 Dec. 2008 pp. 24-29 Digital Object Identifier 10.1109/SI.2008.4770421.*

Optimal weighted data gathering in multi-hop heterogeneous sensor networks; Junlin Li; AlRegib, G.; Military Communications Conference, 2008. MILCOM 2008. IEEE; Nov. 16-19, 2008 pp. 1-7; Digital Object Identifier 10.1109/MILCOM.2008.4753346.*

Quantitative Verification of Projected Views Using a Power Law Model of Feature Detection; Coupe, S.; Thacker, N.; Computer and Robot Vision, 2008. CRV '08. Canadian Conference on, May 28-30, 2008 pp. 352-358; Digital Object Identifier 10.1109/CRV.2008.38.*

A Fuzzy Logic Based Model for Representing and Evaluating Service Composition Properties; Pfeffer, H.; Krussel, S.; Steglich, S.; Systems and Networks Communications, 2008. ICSNC '08. 3rd International Conference on; Oct. 26-31, 2008 pp. 335-342; Digital Object Identifier 10.1109/ICSNC.2008.46.*

Practical Application of Bayesian Reliability Demonstration; Yates, S.W.; Reliability and Maintainability Symposium, 2007. RAMS '07. Annual; Jan. 22-25, 2007 pp. 362-367; Digital Object Identifier 10.1109/RAMS.2007.328074.*

Pose Synthesis Using the Inverse of Jacobian Matrix Learned from Examples; Chunpeng Li; Shihong Xia; Zhaoqi Wang; Virtual Reality Conference, 2007. VR '07. IEEE; Mar. 10-14, 2007 pp. 99-106; Digital Object Identifier 10.1109A/VR.2007.352469.*

National Instruments Corp.; Reducing the Effects of Noise in a Data Acquisition System by Averaging; National Instruments; Apr. 2000:4 pgs.; 11500 N. Mopac Expwy, Austin, Tx.

Glen Turner; Gyroscopes-Everything You Needed to Know; The Gyroscope Forum; www.gyroscopes.org/forum/questions.asp?id=183; Jun. 17, 2005; 1 pg.; U.S.

\* cited by examiner

302

402

502 ly to error reduction in gyroscopes and accel-
ENVIRONMENTAL CHARACTERISTIC DETERMINATION

TECHNICAL FIELD

The invention relates generally to signal processing and more particularerometers.

BACKGROUND

Electronic sensors are often used for measurement of environmental characteristics. Gyroscopes are capable of measuring inertial characteristics, such as angular rate and/or acceleration. In known inertial measurement units ("IMUs"), a single gyroscope is used for each range of motion that is to be measured. For example, IMUs employ a gyroscope for pitch, a gyroscope for roll, and a gyroscope for yaw. In some applications additional gyro(s) may be used for redundancy so that on the event of a gyro failure the redundant gyros(s) data may be used.

Outputs from gyroscopes may be unstable due to error terms that vary over time. Some error terms are caused by environmental changes to the gyroscope, such as temperature fluctuation, shock, and vibration. The error terms may or may not be correlated with each other and may or may not vary between gyroscopes. A specialized and more precise gyroscope may be used to reduce the error terms, but at a higher manufacturing cost.

Thus, a need exists for reduced error terms in environmental characteristic measurements without higher manufacturing costs.

SUMMARY

The invention in one implementation encompasses an apparatus. The apparatus comprises: plurality of concomitant values indicative of an environmental characteristic; and a processor having a plurality of inputs for receiving the plurality of concomitant values and having an output that provides a determination of the environmental characteristic; wherein the processor determines the environmental characteristic based on a combination of the plurality of concomitant values.

Another implementation of the invention encompasses a method. The method comprises: determining, via a plurality of independent electronic sensors, a plurality of independent, concomitant values indicative of an environmental characteristic; calculating, via a processor, an average of the plurality of independent, concomitant values of the environmental characteristic; and providing the average of the plurality of independent, concomitant values as a single value indicative of the environmental characteristic.

A further implementation of the invention encompasses an apparatus. The apparatus comprises an inertial measurement unit that provides a pitch angular rate measurement, a roll angular rate measurement, and a yaw angular rate measurement. The inertial measurement unit comprises: a pitch circuit that comprises a pitch processor and a plurality of independent pitch sensors; a roll circuit that comprises a roll processor and a plurality of independent roll sensors; and a yaw circuit that comprises a yaw processor and a plurality of independent yaw sensors. The pitch processor receives a plurality of concomitant pitch values from the plurality of independent pitch sensors. The pitch processor determines an average of the concomitant pitch values. The roll processor receives a plurality of concomitant roll values from the plurality of independent roll sensors. The roll processor determines an average of the concomitant roll values. The yaw processor receives a plurality of concomitant yaw values from the plurality of independent yaw sensors. The yaw processor determines an average of the concomitant yaw values. The inertial measurement unit provides the average of the concomitant pitch values as the pitch angular rate measurement. The inertial measurement unit provides the average of the concomitant roll values as the roll angular rate measurement. The inertial measurement unit provides the average of the concomitant yaw values as the yaw angular rate measurement.

DESCRIPTION OF THE DRAWINGS

Features of exemplary implementations of the invention will become apparent from the description, the claims, and the accompanying drawings in which:

DETAILED DESCRIPTION

Figure 1:
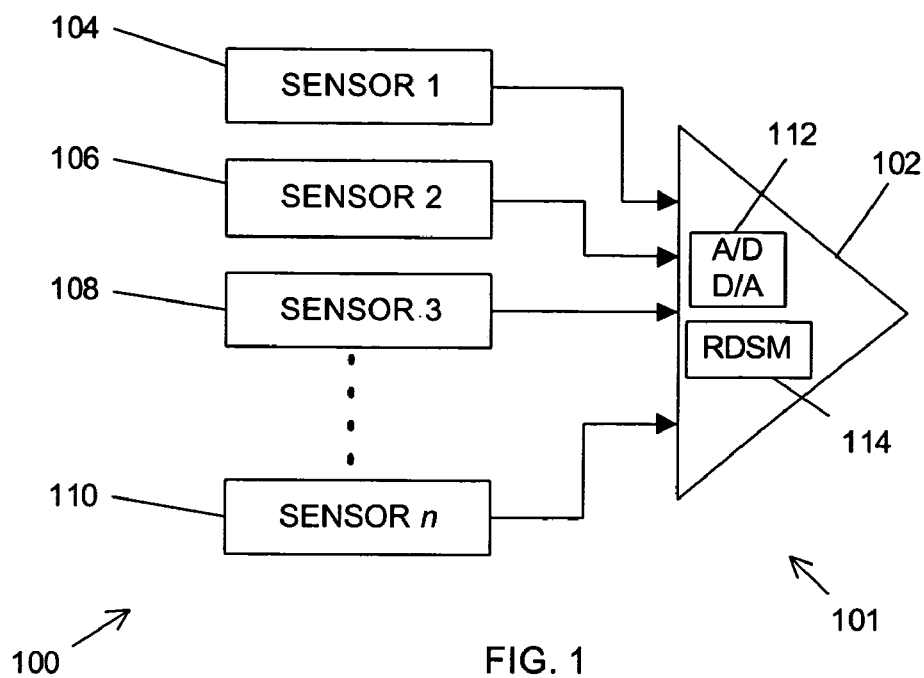
FIG. 1 is a representation of one implementation of an apparatus that comprises a circuit with a processor and a plurality of sensors.

Turning to FIG. 1, an apparatus 100 in one example comprises a circuit 101. The circuit 101 in one example comprises a processor 102 and a plurality of n sensors, for example, sensors 104, 106, 108, and 110. The processor 102 in one example comprises a signal processor. For example, the processor 102 receives signals from the sensors 104, 106, 108, and 110. The processor 102 in one example comprises a digital signal processor. In another example, the processor 102 comprises an analog signal processor. In yet another example, the processor 102 comprises an analog/digital converter 112 ("A/D D/A") for conversion of signals between an analog format and a digital format. The processor 102 makes a determination of an environmental characteristic based on an average of a plurality of concomitant values that correspond to the environmental characteristic. The processor 102 in one example comprises an instance of a recordable data storage medium 114 ("RDSM"), as described herein.

The sensors 104, 106, 108, and 110 comprise electronic sensors. The sensors 104, 106, 108, and 110 serve to obtain a plurality of concomitant values that correspond to the environmental characteristic for the processor 102. For example, the sensors 104, 106, 108, and 110 measure the environmental characteristic. The environmental characteristic in one example comprises an inertial characteristic, for example, an angular rate or angular acceleration. In another example, the environmental characteristics comprise temperature, pressure, strain, electrical field strength, and/or magnetic field strength. The sensors 104, 106, 108, and 110 in one example comprise one or more gyroscopes for measuring the angular rate and/or one or more accelerometers for measuring the angular acceleration. In a further example, the sensors 104, 106, 108, and 110 comprise Micro-Electro-Mechanical Systems (MEMS) gyroscopes and/or accelerometers. The gyroscopes and/or accelerometer in one example are single and/or multi-axis. In one example, the gyroscopes and/or accelerometers are oriented along a same axis. In another example, the gyroscopes and/or accelerometers are oriented along different axes. For example, the angular rates are mathematically combined through employment of relative scaling to obtain a measurement for a desired axis, as will be appreciated by those skilled in the art.

The sensors 104, 106, 108, and 110 in one example comprise independent sensors. For example, each of the sensors 104, 106, 108, and 110 provides a value that corresponds to a measurement of the environmental characteristic. The sensors 104, 106, 108, and 110 in one example provide the values at and/or from a pre-determined time. For example, the sensors 104, 106, 108, and 110 are synchronized with a pre-determined clock signal. In another example, the sensors 104, 106, 108, and 110 operate in real-time. For example, the sensors 104, 106, 108, and 110 provide a continuous output of the value. The sensors 104, 106, 108, and 110 in one example provide the values substantially in parallel, as will be appreciated by those skilled in the art.

Figure 2:
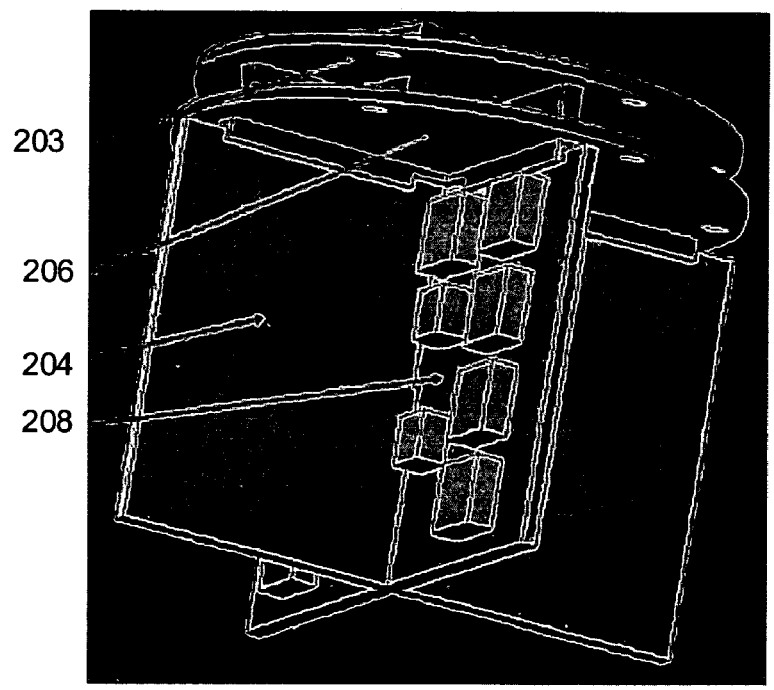
FIG. 2 is a representation of another implementation of the apparatus of FIG. 1 that comprises a plurality of circuit boards.

Turning to FIG. 2, an inertial measurement unit 202 in one example comprises a plurality of circuits 101 and a support circuit 203. For example, each circuit 101 corresponds to a dimension of travel. In one example, the circuits 101 comprise a pitch circuit 204, a roll circuit 206, and a yaw circuit 208. The inertial measurement unit 202 employs the pitch circuit 204, the roll circuit 206, and the yaw circuit 208 to provide a pitch angular rate measurement, a roll angular rate measurement, and a yaw angular rate measurement, respectively. In one example, the pitch circuit 204, the roll circuit 206, and the yaw circuit 208 are functionally and electrically identical. For example, the pitch circuit 204, the roll circuit 206, and the yaw circuit 208 are oriented orthogonally to each other to provide the pitch angular rate measurement, the roll angular rate measurement, and the yaw angular rate measurement, as will be appreciated by those skilled in the art.

The support circuit 203 is electrically coupled with the pitch circuit 204, the roll circuit 206, and the yaw circuit 208. The support circuit 203 in one example comprises one or more communication and/or power interfaces and support logic for the pitch circuit 204, the roll circuit 206, and the yaw circuit 208. In one example, the support circuit 203 routes power from an external source to the pitch circuit 204, the roll circuit 206, and the yaw circuit 208. In a further example, the support circuit 203 outputs the pitch angular rate measurement, the roll angular rate measurement, and the yaw angular rate measurement through an output interface. The support circuit 203 in one example comprises a signal processor for processing the pitch angular rate measurement, the roll angular rate measurement, and the yaw angular rate measurement before outputting the pitch angular rate measurement, the roll angular rate measurement, and the yaw angular rate measurement.

An illustrative description of exemplary operation of the apparatus 100 is presented, for explanatory purposes. Each sensor of the plurality of sensors 104, 106, 108, and 110 determines a value that corresponds to a measurement of the environmental characteristic. For example, the plurality of independent sensors determine a plurality of independent values. In one example, each of the plurality of independent values is from a same, pre-determined time. For example, the plurality of independent values are concomitant. The processor 102 obtains the plurality of independent values from the plurality of sensors 104, 106, 108, and 110. The values for the environmental characteristic comprise error terms, for example, a drift scaling factor, noise, and drift rate. The processor 102 makes a determination of the environmental characteristic based on an average of the plurality of values to reduce an effect of the error terms, as will be appreciated by those skilled in the art.

The processor 102 in one example receives each value of the plurality of values at a same, pre-determined time. The processor 102 determines a summation value for the plurality of values. For example, the processor 102 adds the concomitant values together to obtain the summation value. In a further example, the processor 102 multiplies each value of the plurality of values by a pre-determined weighting value. For example, where a first gyroscope is known to be more accurate than a second gyroscope, the processor 102 multiplies the value from the first gyroscope by a weighting value of two and multiplies the value from the second gyroscope by a weighting value of one. Thus, the processor 102 gives the first gyroscope a higher priority than the second gyroscope.

The processor 102 divides the summation value by a scaling value to obtain an average of the plurality of values. Where the processor 102 employs weighting values as described above, the average comprises a weighted average. In one example, the scaling value is equal to the number n of the plurality of sensors. For example, a scaling factor of the average of the plurality of values is equal to one. In another example, the scaling value is smaller than the number n and the scaling factor is greater than one. The scaling factor can be increased or decreased by adjusting the scaling value. The processor 102 in one example outputs the average of the plurality of values to one or more of a navigation, control, and/or inertial guidance system, as will be appreciated by those skilled in the art.

The processor 102 in one example determines the average of the plurality of concomitant values to reduce a number of error terms in the measurement of the environmental characteristic. For example, where an error term of a value from a first sensor is uncorrelated with a value from other sensors, the processor 102 determines the average to reduce a magnitude of the error term. The error term may be reduced as a square root of the number n of sensors. For example, where the processor 102 employs four sensors, the error term is reduced by a factor of two. In another example where the processor 102 employs sixteen sensors, the error term is reduced by a factor of four. Since the processor 102 reduces the number of error terms by determining the average, a required level of quality for the sensors can be reduced. For example, a plurality of inexpensive MEMS gyroscopes can be used in place of a single, expensive gyroscope, as will be appreciated by those skilled in the art.

Figure 3:
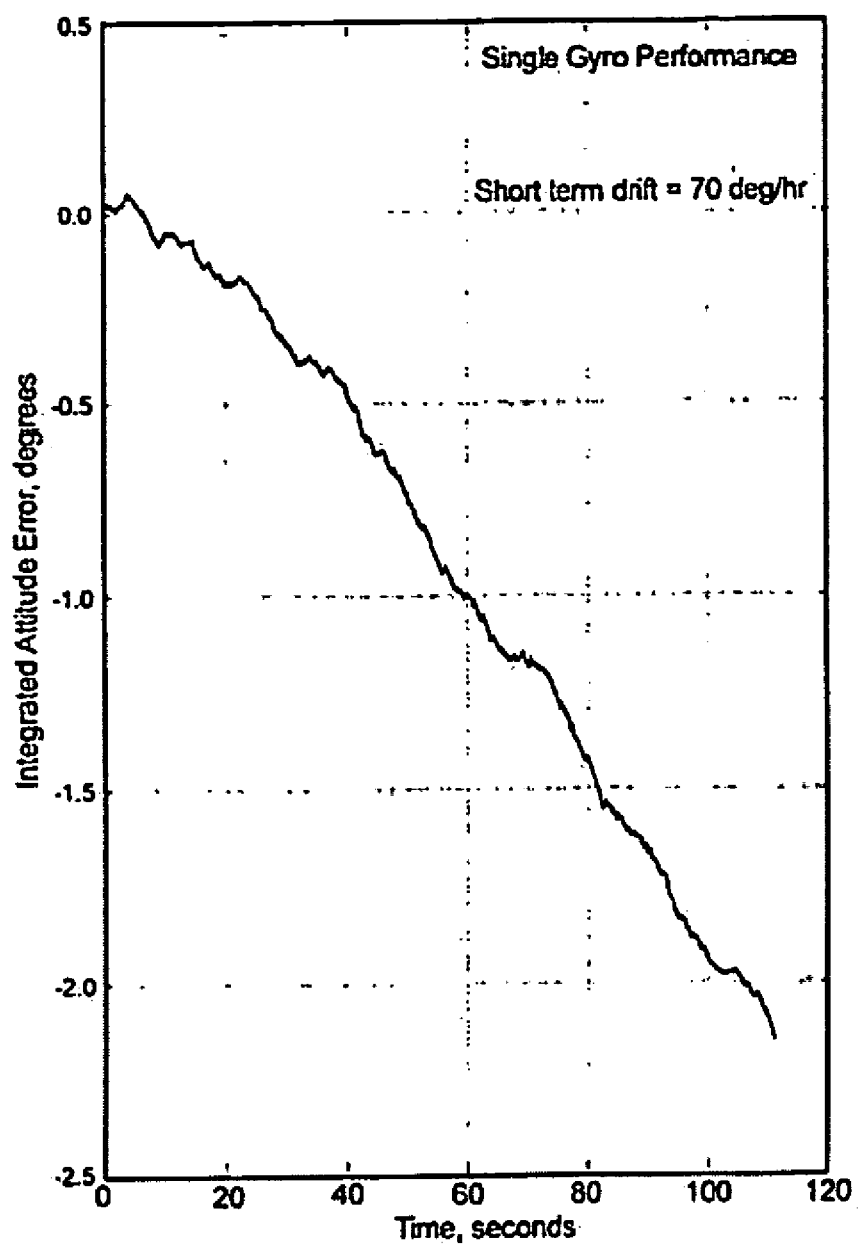
FIG. 3 is a representation of an exemplary plot of short term drift for a single gyroscope.
Figure 4:
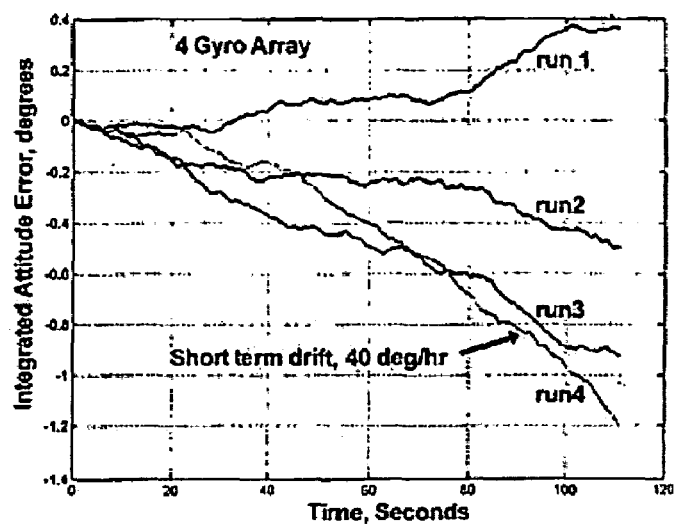
FIG. 4 is a representation of exemplary plots of short term drift for the apparatus of FIG. 1 where the plurality of sensors comprises four gyroscopes.
Figure 5:
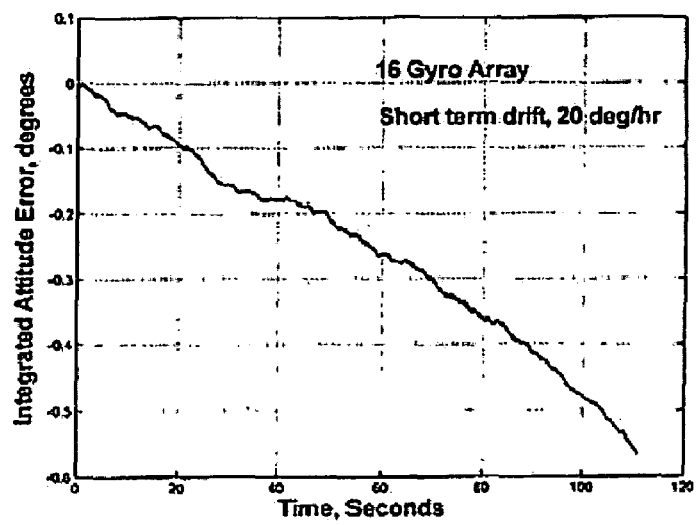
FIG. 5 is a representation of an exemplary plot of short term drift for the apparatus of FIG. 1 where the plurality of sensors comprises sixteen gyroscopes.

Turning to FIGS. 3-5, plots 302, 402, and 502 comprise plots of short term drift samples for one or more gyroscopes. Referring to FIG. 3, the plot 302 comprises a plot of a short term drift sample for a single gyroscope. The short term drift is approximately seventy degrees per hour. Referring to FIG. 4, the plot 402 comprises four short term drift samples (Run 1, Run 2, Run 3, and Run 4) for the apparatus 100 where the plurality of n sensors comprises four gyroscopes. The short term drift of Run 4 was the highest of the four samples and reduced to approximately forty degrees per hour, an improvement of approximately 1.75 times the single gyroscope sample of FIG. 3. Referring to FIG. 5, the plot 502 comprises a plot of a short term drift sample for the apparatus 100 where the plurality of n sensors comprises sixteen gyroscopes. The short term drift was reduced to approximately twenty degrees per hour, an improvement of approximately 3.5 times the single gyroscope sample of FIG. 3.

Figure 6:
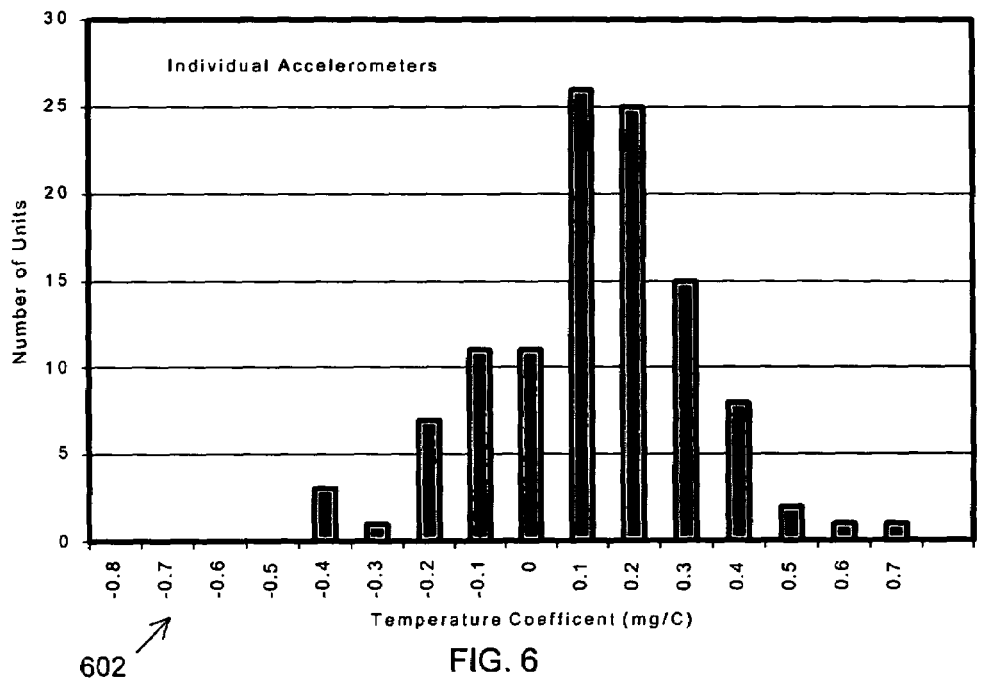
FIG. 6 is a representation of an exemplary histogram of temperature coefficient for individual accelerometers.
Figure 7:
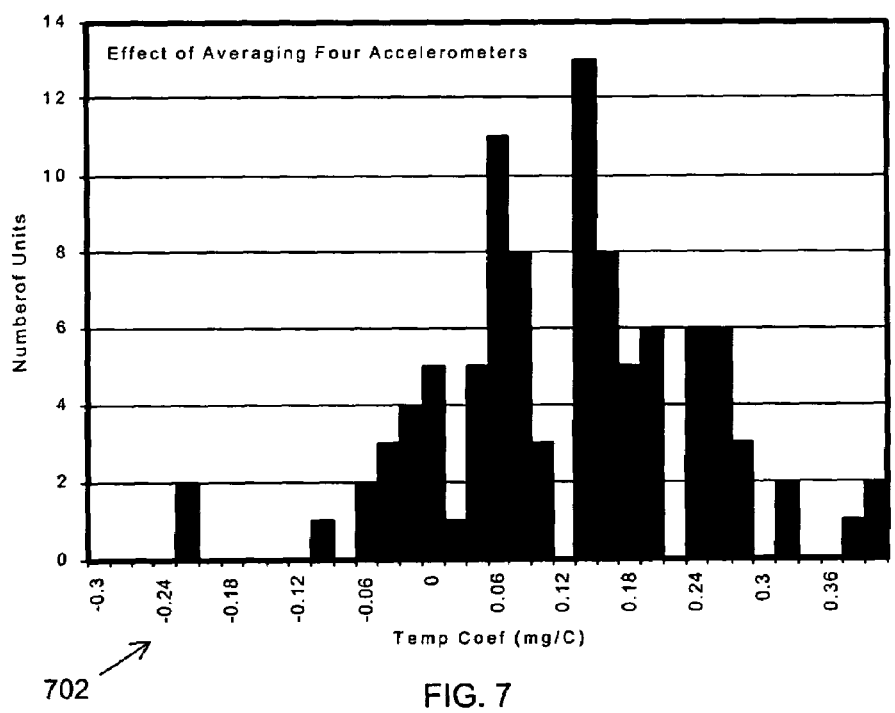
FIG. 7 is a representation of an exemplary histogram of temperature coefficient for the apparatus of FIG. 1 where the plurality of sensors comprises four accelerometers.
Figure 8:
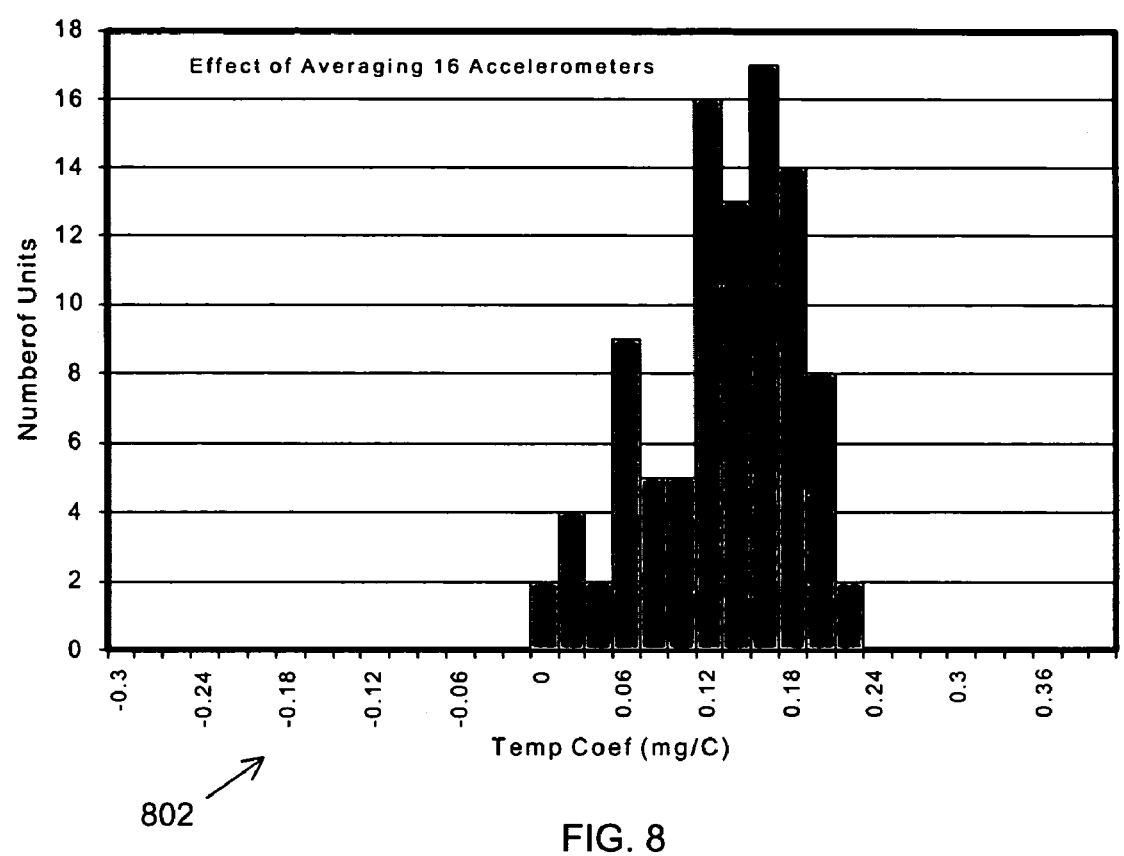
FIG. 8 is a representation of an exemplary histogram of temperature coefficient for the apparatus of FIG. 1 where the plurality of sensors comprises sixteen accelerometers.

Turning to FIGS. 6-8, histograms 602, 702, and 802 comprise sample histograms of a temperature coefficient for a plurality of accelerometers. The histograms 602, 702, and 802 are based on approximately 110 individual accelerometer samples. Referring to FIG. 6, the histogram 602 shows that temperature coefficients for the individual accelerometers were approximately within a range of 1.1, between −0.4 and 0.7. Referring to FIG. 7, sets of four randomly selected individual accelerometer samples were averaged. This reduced the range of temperature coefficients for the samples to approximately 0.62, between −0.22 and 0.40, an improvement of approximately 1.77 times the range of the individual accelerometer samples of FIG. 7. Referring to FIG. 8, sets of sixteen randomly selected individual accelerometer samples were averaged. This reduced the range of temperature coefficients for the samples to approximately 0.22, between 0.0 and 0.22, an improvement of approximately 5.0 times the range of the individual accelerometer samples of FIG. 6.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 114 of the processor 102. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus for sensing an environmental characteristic, comprising:
   a processor having a plurality of inputs for receiving a plurality of concomitant values indicative of the environmental characteristic and having an output that provides a determination of the environmental characteristic; and
   a plurality of sensors that obtain the plurality of concomitant values;
   wherein each of the plurality of sensors comprises an output operatively coupled to a respective input of the processor;
   wherein the processor is configured to determine the environmental characteristic based on an average of the plurality of concomitant values;
   wherein the processor multiplies each of the plurality of concomitant values by at least one weighting value to determine a weighted average of the plurality of concomitant values;
   wherein the at least one weighting value is based on accuracy levels of the plurality of sensors.

2. The apparatus of claim 1, wherein the processor multiplies a more accurate sensor of the plurality of sensors by a higher weighting value than other sensors of the plurality of sensors.

3. The apparatus of claim 1, wherein the plurality of sensors comprise independent sensors of the environmental characteristic.

4. The apparatus of claim 1, wherein the processor determines the average of the plurality of concomitant values in order to reduce error terms in the plurality of concomitant values.

5. The apparatus of claim 1, wherein the plurality of sensors comprise at least one gyroscope and at least one accelerometer.

6. The apparatus of claim 5, wherein the gyroscope is a Micro-Electro-Mechanical Systems gyroscope.

7. The apparatus of claim 5, wherein the accelerometer is a Micro-Electro-Mechanical Systems accelerometer.

8. The apparatus of claim 1, wherein the processor employs the at least one weighting value to give higher priority to more accurate sensors.

9. The apparatus of claim 1, wherein the determination of the environmental characteristic comprises a determination of the environmental characteristic for a pre-determined time period;
   wherein the plurality of concomitant values comprise a plurality of concomitant values from the pre-determined time period.

10. The apparatus of claim 1, wherein the combination is an average of the plurality of concomitant values and wherein the average comprises a summation value divided by a scaling value; and
    wherein the summation value comprises a summation of the plurality of concomitant values, wherein the scaling value comprises a number of the plurality of concomitant values multiplied by a scaling factor.

11. The apparatus of claim 1, wherein the environmental characteristic comprises at least one of angular rate, angular anceleration, temperature, pressure, strain, electrical field strength, and magnetic field strength.

12. The apparatus of claim 1, wherein the environmental characteristic is pitch and wherein the output of the processor is a pitch angular rate measurement determined from an average of the plurality of concomitant values.

13. The apparatus of claim 12, wherein the environmental characteristic is pitch and wherein the output of the processor is a pitch angular rate measurement determined from a weighted average of the plurality of concomitant values.

14. The apparatus of claim 1, wherein the environmental characteristic is roll and wherein the output of the process is a roll angular rate measurement determined from an average of the plurality of concomitant values.

15. The apparatus of claim 1, wherein the environmental characteristic is yaw and wherein the output of the process is a yaw anguiar rate measurement determined from an average of the plurality of concomitant values.

16. The apparatus of claim 1, wherein the environmental characteristic is pitch and wherein the output of the process is an average of the plurality of concomitant values.

17. The apparatus of claim 1, wherein the environmental characteristic comprises a pitch angular rate, a roll angular rate, and a yaw angular rate;
wherein the apparatus further comprises:
a pitch circuit for the pitch angular rate that comprises a first instance of the processor as a pitch processor and a first instance of the plurality of sensors as a plurality of independent pitch sensors;
a roll circuit for the roll angular rate that comprises a second instance of the processor as a roll processor and a second instance of the plurality of sensors as a plurality of independent roll sensors; and
a yaw circuit for the yaw angular rate that comprises a third instance of the processor as a yaw processor and a third instance of the plurality of sensors as a plurality of independent yaw sensors,
wherein the pitch circuit, the roll circuit, and the yaw circuit are configured as an inertial measurement unit which provides a measurement of pitch angular rate, the roll angular rate, and the yaw angular rate.

18. The apparatus of claim 17, wherein at least one of the plurality of independent pitch sensors, the plurality of independent roll sensors, and the plurality of independent yaw sensors comprise at least one Micro-Electro- Mechanical Systems accelerometer.

19. The apparatus of claim 17, wherein the inertial measurement unit provides the pitch angular rate measurement, the roll angular rate measurement, and the yaw angular rate measurement for at least one of a navigation, control, and inertial guidance system.

20. The apparatus of claim 17, wherein at least one of the plurality of independent pitch sensors, the, plurality of independent roll sensors, and the plurality of independent yaw season comprise at least one Micro-Electro- Mechanical Systems gyroscope.

* * * * *